(12) United States Patent
Sim et al.

(10) Patent No.: US 9,104,974 B2
(45) Date of Patent: Aug. 11, 2015

(54) APPARATUS AND METHOD FOR TRANSMITTING AND RECEIVING DETERMINED SPIKE EVENTS BETWEEN NEURONS IN NEUROMORPHIC CHIPS UTILIZING A STROBE REPRESENTING SPIKE OCCURRENCE TIME INFORMATION

(75) Inventors: Jae Yoon Sim, Pohang-si (KR); Jun Haeng Lee, Hwaseong-si (KR); Hyun Surk Ryu, Hwaseong-si (KR); Keun Joo Park, Seoul (KR); Chang Woo Shin, Hwaseong-si (KR)

(73) Assignees: Samsung Electronics Co., Ltd., Suwon-si (KR); POSTECH Academy-Industry Foundation, Pohang-si (KR)

( * ) Notice: Subject to any disclaimer, the term of this patent is extended or adjusted under 35 U.S.C. 154(b) by 489 days.

(21) Appl. No.: 13/560,261

(22) Filed: Jul. 27, 2012

(65) Prior Publication Data

US 2013/0031039 A1    Jan. 31, 2013

(30) Foreign Application Priority Data

Jul. 27, 2011    (KR) .......................... 10-2011-0074388

(51) Int. Cl.
*G06N 3/063*    (2006.01)
*G06N 3/04*    (2006.01)

(52) U.S. Cl.
CPC ................ *G06N 3/049* (2013.01); *G06N 3/063* (2013.01); *G06N 3/0635* (2013.01)

(58) Field of Classification Search
CPC ...... G06N 3/063; G06N 3/0635; G06N 3/049

USPC .......................................................... 706/26
See application file for complete search history.

(56) References Cited

U.S. PATENT DOCUMENTS

| 5,704,016 A | 12/1997 | Shigematsu et al. |
| 2003/0004907 A1 | 1/2003 | Matsugu |
| 2006/0116738 A1* | 6/2006 | Wolf et al. ...................... 607/45 |

(Continued)

FOREIGN PATENT DOCUMENTS

| EP | 1089221 A2 | 4/2001 |
| JP | 2002-232440 A | 8/2002 |

(Continued)

OTHER PUBLICATIONS

Boahen. Communicating Neuronal Ensembles between Neuromorphic Chips. Kluwer Academic Publishers. Boston. 1998.*

(Continued)

*Primary Examiner* — Jeffrey A Gaffin
*Assistant Examiner* — Robert H Bejcek, II
(74) *Attorney, Agent, or Firm* — NSIP Law

(57) ABSTRACT

An apparatus and a method for transmitting and receiving a spike event in a neuromorphic chip. A transmission apparatus of the neuromorphic chip outputs addresses sequentially and repeatedly to an address bus, and when a spike generated by a neuron is detected by the transmission apparatus, outputs a strobe at a first time when one of the addresses being output sequentially and repeatedly becomes identical to an address of the neuron that generated the spike. A receiving apparatus of the neuromorphic chip inputs an address through the address bus at a strobe detection time when the strobe is detected by the receiving apparatus.

23 Claims, 8 Drawing Sheets

(56) References Cited

U.S. PATENT DOCUMENTS

2009/0287624 A1  11/2009  Rouat et al.
2011/0106741 A1  5/2011  Denneau et al.

FOREIGN PATENT DOCUMENTS

KR  10-2009-0093386 A  9/2009
KR  10-2010-0129741 A  12/2010

OTHER PUBLICATIONS

Vogelstein et alia. Spike Timing-Dependent Plasticity in the Address Domain. Advances in Neural Information Processing Systems. Cambridge, MA: MIT Press, 2003.*

Boahen. Point-to-Point Connectivity Between Neuromorphic Chips Using Address Events. IEEE Transactions on Circuits and Systems II: Analog and Digital Signal Processing, vol. 47, Issue 5, May 2000, pp. 416-434.*

Masaki et alia. Neural Networks in CMOS: a Case Study. Circuits and Devices, Jul. 1990, pp. 12-17.*

Boahen. A Throughput-On-Demand Address-Event Transmitter for Neuromorphic Chips. Conference on Advanced Research in VLSI, 1999. pp. 72-86.*

Merolla et alia. Expandable Networks for Neuromorphic Chips. IEEE Transactions on Circuits and Systems—I: Regular Papers, 2006.*

Linares-Barranco et alia. Implementation of a Time-Warping AER Mapper. IEEE International Symposium on Circuits and Systems, 2009. ISCAS 2009.*

* cited by examiner

APPARATUS AND METHOD FOR TRANSMITTING AND RECEIVING DETERMINED SPIKE EVENTS BETWEEN NEURONS IN NEUROMORPHIC CHIPS UTILIZING A STROBE REPRESENTING SPIKE OCCURRENCE TIME INFORMATION

CROSS-REFERENCE TO RELATED APPLICATIONS

This application claims the benefit of Korean Patent Application No. 10-2011-0074388 filed on Jul. 27, 2011, in the Korean Intellectual Property Office, the disclosure of which is incorporated herein by reference in its entirety.

BACKGROUND

1. Field

The following description relates to an apparatus and a method for transmitting and receiving a spike event between neurons in a neuromorphic chip.

2. Description of Related Art

In a brain, tens of billions of nerve cells, that is, neurons, are interconnected through a complex nerve network. Each neuron develops intellectual abilities such as learning and memory by an exchange of signals, via synapses, with thousands of other neurons. A neuron is a structural and functional unit of a nervous system, and also a basic unit of data transmission. A synapse refers to a connection point between neurons, more particularly, to a connection point between an axon of one neuron and a dendrite of another neuron. Thus, one neuron is connected with thousands of other neurons through the synapses. By manufacturing an artificial nervous system that copies a biological nervous system in units of a neuron, a data processing system simulating a brain may be achieved. A neuromorphic chip is a semiconductor circuit that implements such a data processing system.

The neuromorphic chip is effective when implementing an intelligent system capable of autonomously adapting to an unspecified environment. Such a technology may be applied to computers, robots, home appliances, small mobile devices, security and monitoring, intelligent car security, autonomous driving, and the like that perform recognition and estimation such as voice recognition, danger recognition, and real-time fast signal processing.

In the neuromorphic chip, a communication channel for transmission of event information is used to read a spike event generated by a neuron or transmit the spike event to another neuron. Conventionally, address event representation (AER) has been used, which asynchronously writes, to a communication bus, an address of a neuron in which an event occurs, at the time the spike event occurs. However, the AER method complicates a structure of a transceiver for reading and writing of the address.

SUMMARY

According to a general aspect, a transmission apparatus for transmitting a spike event in a neuromorphic chip including the transmission apparatus includes an address output unit configured to output addresses sequentially and repeatedly to an address bus; spike detection units configured to detect spikes generated by corresponding neurons; output-time detection units corresponding to the spike detection units, the output-time detection units being configured to detect a first time when one of the addresses being output sequentially and repeatedly becomes identical to an address of a one of the neurons that has generated a spike after the spike generated by one of the neuron is detected by a corresponding one of the spike detection units; and a strobe output unit configured to output a strobe that represents time information about a spike occurrence time of the spike generated by the neuron when the corresponding one of the output-time detection units detects the first time.

The strobe may have a pulse shape.

The neuromorphic chip may further include the neurons; and the addresses may be allocated to the neurons of the neuromorphic chip so that each of the addresses corresponds to a different one of the neurons of the neuromorphic chip.

The neuromorphic chip may further include a clock generation unit configured to generate an address generation clock; and the address output unit may include a counter configured to increase a counter value in response to the address generation clock generated by the clock generation unit, output the counter value to the address bus as an address of one of the neurons, and initialize the counter value at every predetermined period.

The clock generation unit may be further configured to generate a neuron detection clock that operates the spike detection units, and the spike detection units may be further configured to detect the spikes generated by the corresponding neurons in response to the neuron detection clock.

The clock generation unit may be configured to generate the address generation clock so that the address generation clock has at least as many clock periods as there are neurons during one clock period of the neuron detection clock.

Each of the output-time detection units may include a D flip-flop configured to receive an input pulse, delay the received input pulse by one clock period, and output the delayed input pulse using a same clock as the address output unit; and an AND gate configured to perform an AND operation of an output of a corresponding one of the spike detection units and the delayed input pulse output by the D flip-flop, and output a result of the AND operation to the strobe output unit.

The D flip-flop may be further configured to output the delayed input pulse to an input of the D flip-flop of a next one of the output-time detection units corresponding to a next one of the addresses output by the address output unit.

The strobe output unit may include an OR gate configured to perform an OR operation on outputs of the output-time detection units, and output a result of the OR operation as the strobe.

The address bus may include a number of address lines greater than or equal to $\log_2 M$, wherein M is a total number of the neurons.

According to an aspect, a receiving apparatus for receiving a spike event in a neuromorphic chip including the receiving apparatus includes a strobe detection unit configured to detect a strobe that represents time information about a spike occurrence time of a spike generated by a neuron; and an address input unit to receive addresses sequentially and repeatedly through an address bus, and input an address received by the address input unit through the address bus at a strobe detection time when the strobe detection unit detects the strobe.

The strobe may have a pulse shape.

The neuromorphic chip may further include a plurality of neurons; and the addresses may be allocated to the neurons of the neuromorphic chip so that each of the addresses corresponds to a different one of the neurons of the neuromorphic chip.

The neuromorphic chip may further include a plurality of neurons; and the address bus may include a number of address lines greater than or equal to $\log_2 M$, wherein M is a total number of the neurons of the neuromorphic chip.

According to an aspect, a receiving apparatus for receiving a spike event in a neuromorphic chip including the receiving apparatus includes a D flip-flop configured to receive addresses sequentially and repeatedly through an address bus, detect a strobe that represents time information about a spike occurrence time of a spike generated by a neuron, and input an address received by the D flip-flip through the address bus at a strobe detection time when the D flip-flop detects the strobe.

According to an aspect, a method of transmitting a spike event in a neuromorphic chip includes outputting addresses sequentially and repeatedly to an address bus; detecting a spike generated by a neuron; and outputting, when the spike is detected, a strobe that represents time information about a spike occurrence time of the spike generated by the neuron at a first time when one of the addresses being sequentially and repeatedly output becomes identical to an address of the neuron that generated the spike.

The strobe may have a pulse shape.

The neuromorphic chip may include a plurality of neurons; the neuron that generated the spike may be one of the neurons; and the addresses may be allocated to the neurons of the neuromorphic chip so that each of the address corresponds to a different one of the neurons of the neuromorphic chip.

The neuromorphic chip may include a plurality of neurons; the neuron that generated the spike may be one of the neurons; and the address bus may include a number of address lines greater than or equal to $\log_2 M$, wherein M is a total number of the neurons of the neuromorphic chip.

According to an aspect, a method of receiving a spike event in a neuromorphic chip includes receiving addresses sequentially and repeatedly through an address bus; detecting a strobe that represents time information about a spike occurrence time of a spike generated by a neuron; and inputting an address received through the address bus at a strobe detection time when the strobe is detected.

The strobe may have a pulse shape.

The neuromorphic chip may include a plurality of neurons; and the addresses may be allocated to the neurons included of the neuromorphic chip so that each of the addresses is allocated to a different one of the neurons of the neuromorphic chip.

The neuromorphic chip may include a plurality of neurons; and the address bus may include a number of address lines greater than or equal to $\log_2 M$, wherein M is a total number of the neurons of the neuromorphic chip.

Other features and aspects will be apparent from the following detailed description, the drawings, and the claims.

According to aspects, an apparatus and a method for transmitting and receiving a spike event in a neuromorphic chip may separately synchronize and transmit address information of a neuron in which a spike event occurs and time information about an occurrence time of the spike event. As a result, a transceiver structure of the neuromorphic chip may be simplified.

DETAILED DESCRIPTION

Figure 1:
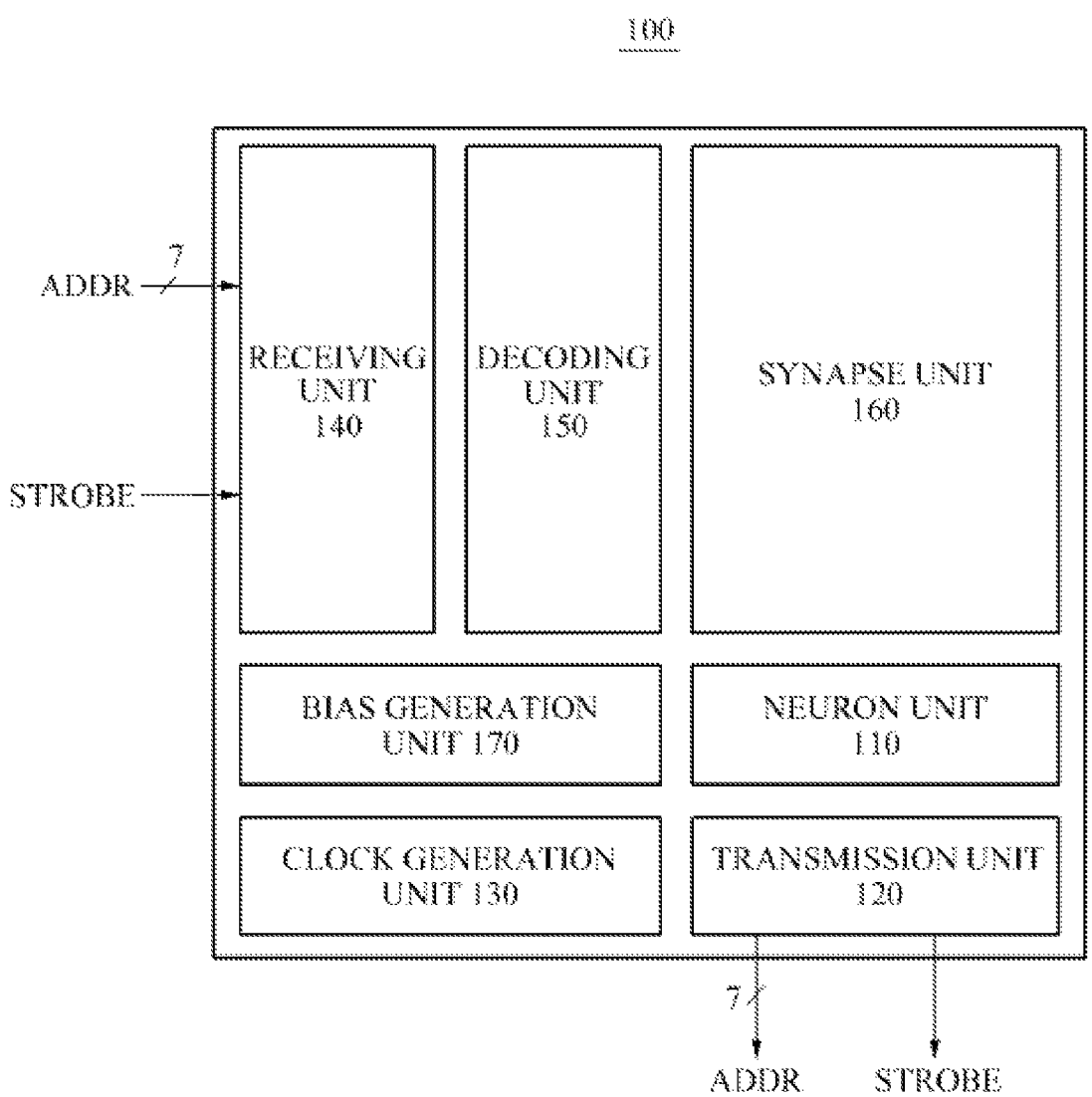
FIG. 1 is a diagram illustrating an example of a structure of a neuromorphic chip.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The sequence of processing steps and/or operations described is merely an example, and the sequence of processing steps and/or operations is not limited to that set forth herein, and may be changed as is known in the art, with the exception of processing steps and/or operations necessarily occurring in a certain order. Also, description of well-known functions and constructions may be omitted for increased clarity and conciseness.

Throughout the drawings and the detailed description, the same reference numerals refer to the same elements. The relative size and depiction of these elements may be exaggerated for clarity, illustration, and convenience.

FIG. 1 is a diagram illustrating an example of a structure of a neuromorphic chip 100.

Referring to FIG. 1, the neuromorphic chip 100 includes a neuron unit 110, a transmission unit 120, a clock generation unit 130, a receiving unit 140, a decoding unit 150, a synapse unit 160, and a bias generation unit 170.

The neuron unit 110 includes neurons each outputting a spike when a current received through synapses exceeds a predetermined threshold quantity.

The transmission unit 120 synchronizes an address of a neuron in which a spike event occurs with a strobe corresponding to time information about a spike event occurrence time, and transmits the synchronized address and strobe.

The clock generation unit 130 generates a clock. The transmission unit 120 performs the synchronization of the address with the strobe using the clock.

The receiving unit 140 receives addresses sequentially and repeatedly through an address bus. Also, the receiving unit 140 receives a strobe that represents time information about a spike occurrence time. When the receiving unit 140 receives the strobe, the receiving unit 140 inputs an address received through the address bus at a strobe detection time to the decoding unit 150.

When it receives the input address from the receiving unit 140, the decoding unit 150 generates a spike and transmits the spike to a synapse connected to a neuron corresponding to the received input address.

The synapse unit 160 includes synapses. The synapses control a connection strength of the spike input through the decoding unit 150 according to a connection strength control variable generated by the bias generation unit 170, and then transmit the spike to neurons connected to the synapses.

A plurality of the neuromorphic chips 100 can be interconnected so that the address and the strobe output by the transmission unit 120 of one of the plurality of neuromorphic chips 100 are received by the receiving unit 140 of one or more other ones of the plurality of neuromorphic chips 100. This enables a spike generated by one of the neurons of the one neuromorphic chip 100 to be transmitted to one or more neurons of the one or more other neuromorphic chips 100.

Figure 2:
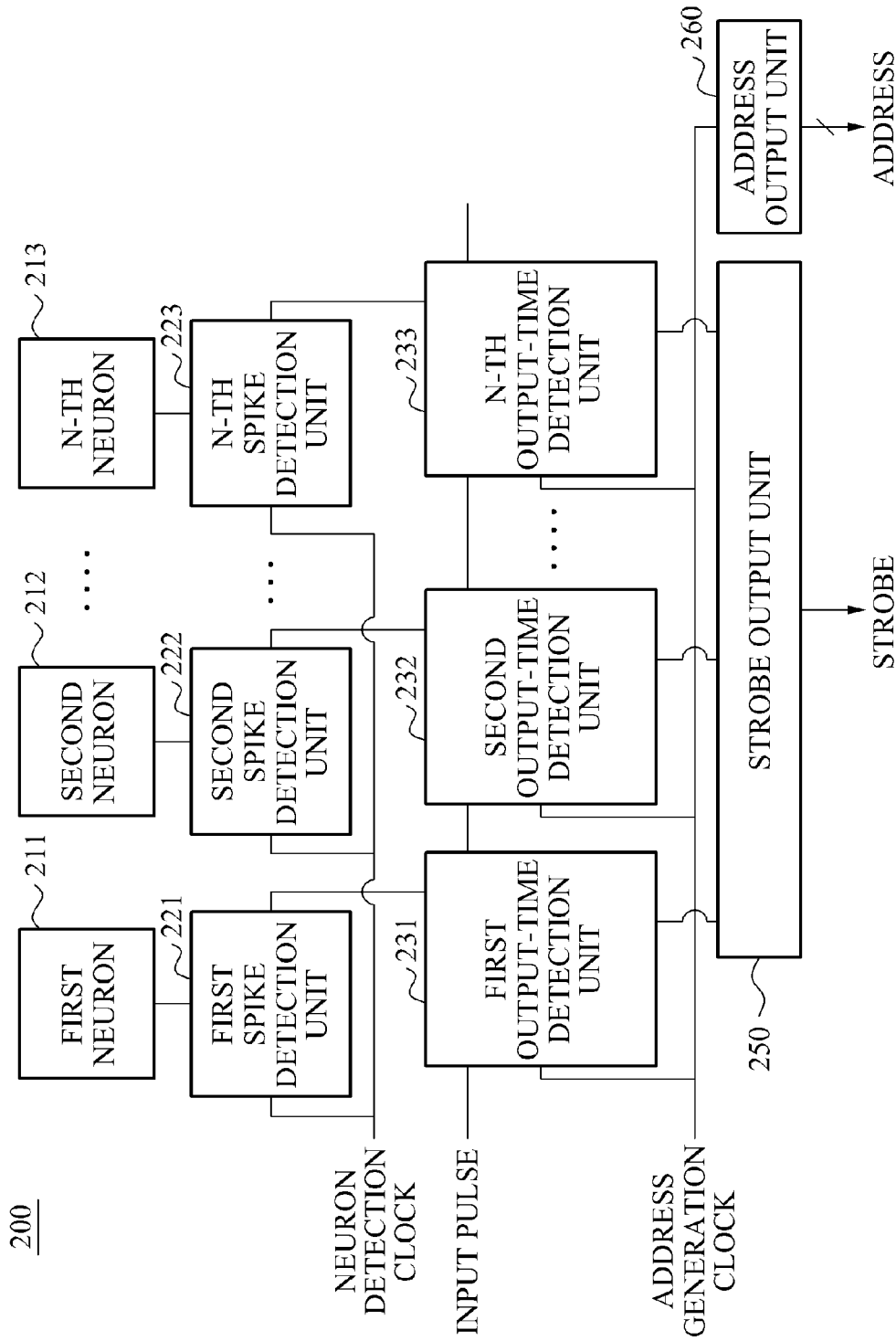
FIG. 2 is a diagram illustrating an example of a structure of a transmission unit that transmits a spike event in a neuromorphic chip.

FIG. 2 is a diagram illustrating an example of a structure of a transmission unit 200 that transmits a spike event in a neuromorphic chip, and may be used as the transmission unit 120 in FIG. 1.

Referring to FIG. 2, the transmission unit 200 of the neuromorphic chip includes N neurons including a first neuron 211, a second neuron 212, and an N-th neuron 213 (hereinafter simply called neurons 211, 212, and 213), N spike detection units including a first spike detection unit, 221, a second spike detection unit, 222, and an N-th spike detection unit 223 (hereinafter simply called spike detection units 221, 222, and 223), N output-time detection units including a first output-time detection unit 231, a second output-time detection unit 232, and an N-th output-time detection unit 233 (hereinafter called simply output-time detection units 231, 232, and 233), a strobe output unit 250, and an address output unit 260. The neurons 211, 212, and 213 are actually part of a neuron unit like the neuron unit 110 in FIG. 1, but are shown as being part of the transmission unit 200 in FIG. 2 for convenience of description.

The address output unit 260 outputs addresses sequentially and repeatedly to an address bus. The addresses are respectively allocated to the neurons 211, 212, and 213 so that each of the addresses is allocated to a different one of the neurons 211, 212, and 213.

The neurons 211, 212, and 213 each output a spike when a current received through a synapse to which the neuron is connected exceeds a predetermined threshold quantity.

The spike detection units 221, 222, and 223 detect output of the spikes from corresponding ones of the neurons 211, 212, and 213, and transmit the detection result to corresponding ones of the output-time detection units 231, 232, and 233. The spike detection units 221, 222, and 223 detect whether the neurons 211, 212, and 213 output spikes during each period of a predetermined neuron detection clock.

When receiving the detection result regarding output of the spikes from the spike detection units 221, 222, and 223, the output-time detection units 231, 232, and 233 detect a first time when an address output from the address output unit 260 becomes identical to an address of one of the neurons 211, 212, and 213 that has generated a spike after the spike is detected by the corresponding one of the spike detection units 221, 222, and 223.

Each of the output-time detection units 231, 232, and 233, using an address generation clock that is also used by the address output unit 260, sequentially delays an input pulse by one clock period and outputs the delayed input pulse as an input to a next one of the output-time detection units 231, 232, and 233 corresponding to a next address.

The output-time detection units 231, 232, and 233 receive the detection result regarding output of the spikes from the corresponding ones of the spike detection units 221, 222, and 223. When the output-time detection units 231, 232, and 233 output the delayed input pulse, the output-time detection units 231, 232, and 233 transmit a detection result regarding the first time to the strobe output unit 250.

When one of the output-time detection units 231, 232, and 233 detects the first time, the strobe output unit 250 outputs a strobe that represents time information about a spike occurrence time. The output strobe may have a pulse shape.

A clock generation unit like the clock generation unit 130 in FIG. 1 generates a neuron detection clock that operates the spike detection units 221, 222, and 223, and generates the address generation clock that operates the output-time detection units 231, 232, and 233 and the address output unit 260. The address generation clock generates at least as many clock periods as there are neurons during one clock period of the neuron detection clock.

The address output unit 260 includes a counter (not shown) that increases a counter value in response to the address generation clock generated by the clock generation unit 130, outputs the counter value to the address bus as an address of one of the neurons 211, 212, and 213, and initializes the counter value at every predetermined period. The predetermined period may be a clock period corresponding to a total number of the addresses of the neurons 211, 212, and 213. The address bus may have a number of address lines greater than or equal to $\log_2 M$, wherein M is a total number of the neurons 211, 212, and 213.

Figure 3:
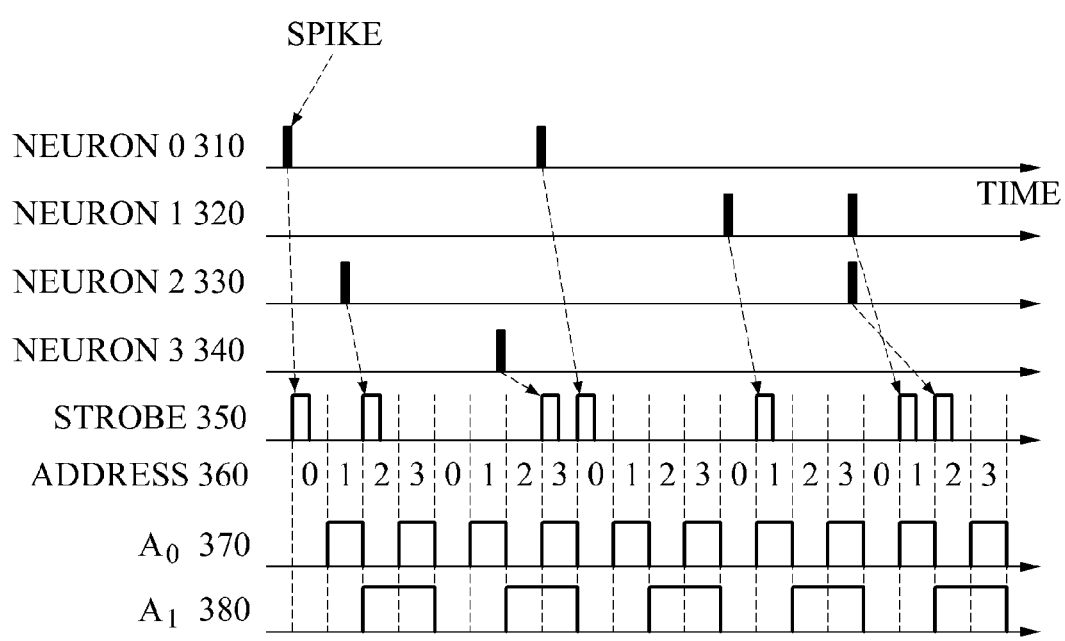
FIG. 3 is a diagram illustrating an example of transmission of a spike event.

FIG. 3 is a diagram illustrating an example of transmission of a spike event.

In the example of FIG. 3, when a spike event occurs in a neuromorphic chip including four neurons: neuron 0 310, neuron 1 320, neuron 2 330, and neuron 3 340, a strobe 350 and an address 360 are output for each spike event.

Referring to FIG. 3, a transmission apparatus of the neuromorphic chip sequentially and repeatedly outputs addresses 360 having address values from 0 to 3 through an address bus irrespective of whether or not spikes are generated by the neurons: neuron 0 310, neuron 1 320, neuron 2 330, and neuron 3 340.

Since the neuromorphic chip includes four neurons: neuron 0 310, neuron 1 320, neuron 2 330, and neuron 3 340, a number of addresses is four. The four addresses are expressed by two address bits $A_0$ 370 and $A_1$ 380 that are output on two address lines of the address bus.

Therefore, the transmission apparatus sequentially and repeatedly outputs address values 00, 01, 10, and 11 expressed by the two address bits $A_0$ 370 and $A_1$ 380 as the addresses 360 to two address lines of the address bus.

When detecting output of spikes from the neurons: neuron 0 310, neuron 1 320, neuron 2 330, and neuron 3 340, the transmission apparatus outputs, to a strobe output, a strobe that represents time information about a spike occurrence time at a first time when the address 360 output to the address bus becomes identical to an address of one of the neurons: neuron 0 310, neuron 1 320, neuron 2 330, and neuron 3 340 outputting the spike.

Figure 4:
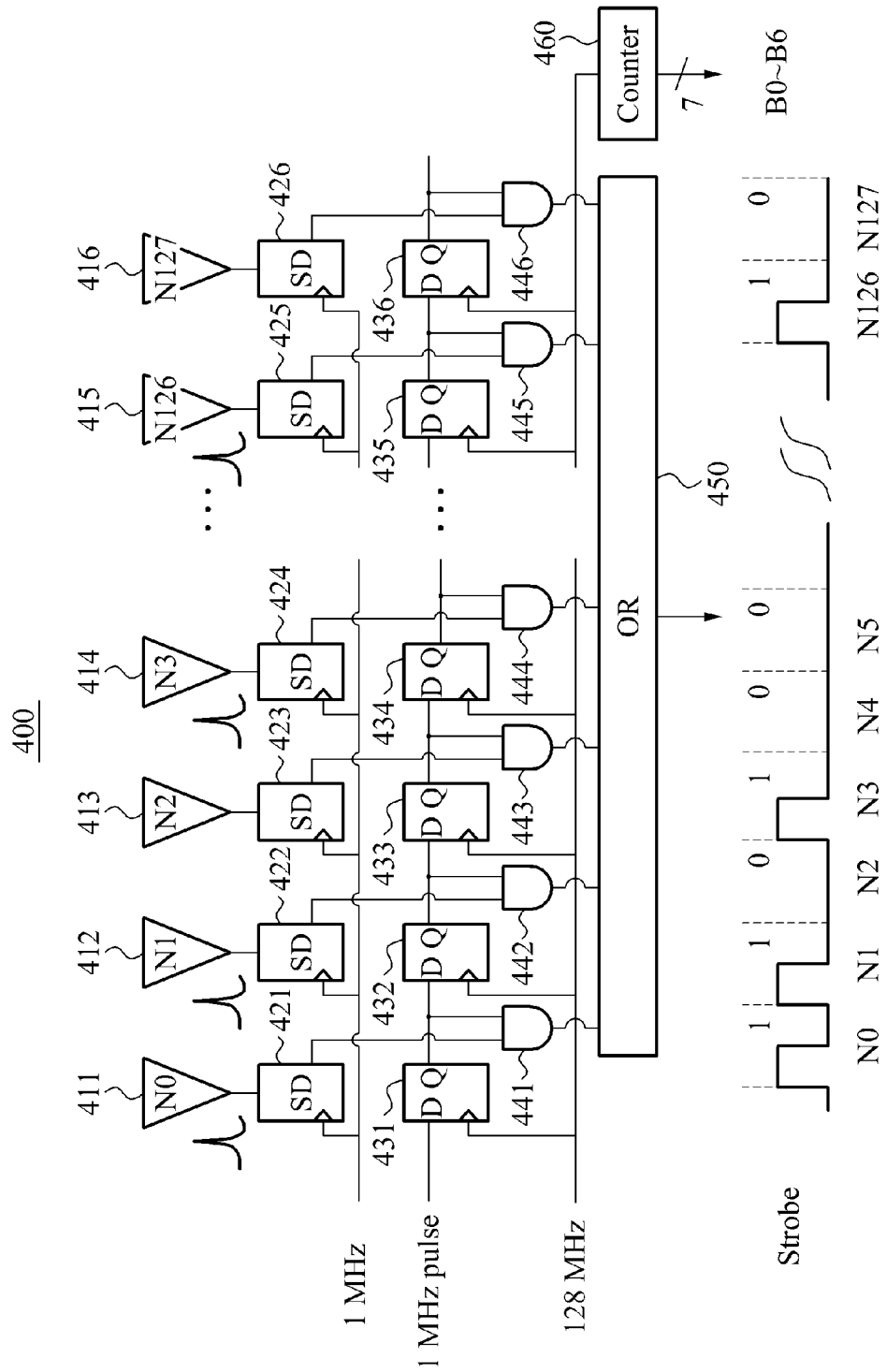
FIG. 4 is a diagram illustrating an example of a transmission unit that transmits a spike event in a neuromorphic chip.

FIG. 4 is a diagram illustrating an example of a transmission unit 400 that transmits a spike event in a neuromorphic chip, and may be used as the transmission unit 120 in FIG. 1 and the transmission unit 200 in FIG. 2.

Referring to FIG. 4, the transmission unit 400 includes neurons 411 to 416, spike detection units 421 to 426, D flip-flops 431 to 436, AND gates 441 to 446, an OR gate 450, and a counter 460. The neurons 411 to 416 are actually part of a neuron unit like the neuron unit 110 in FIG. 1, but are shown as being part of the transmission unit 400 in FIG. 4 for convenience of description.

The counter 460 outputs addresses sequentially and repeatedly to an address bus (not shown). The counter 460 increases a counter value in response to an address generation clock of about 128 MHz, outputs the counter value to the address bus as address bits B0 to B6 expressing addresses of the neurons 411 to 416, and initializes the counter value at every predetermined period.

The neurons 411 to 416 output spikes when a current received by the neurons 411 to 416 through synapses (not shown, but like the synapses in the synapse unit 160 in FIG. 1) exceeds a predetermined threshold quantity.

The spike detection units 421 to 426 detect output of the spikes from the neurons 411 to 416, and transmit the detection result to the AND gates 441 to 446 respectively corresponding to the spike detection units 421 to 426. The spike detection units 421 to 426 detect whether the neurons 411 to 416 output the spikes in response to a neuron detection clock of about 1 MHz.

The D flip-flops 431 to 436 delay a 1 MHz input pulse by one clock period in response to a clock of about 128 MHz, which is the same as the clock used by the counter 460, and output the delayed input pulse to corresponding ones of the AND gates 441 to 446.

Each of the D flip-flops 431 to 436 outputs the delayed input pulse to an input of a next one of the D flip-flops 431 to 436 corresponding to a next one of the addresses output by the counter 460. For example, the D flip-flop 431 outputs the delayed input pulse to an input of the D flip-flop 432.

The AND gates 441 to 446 perform an AND operation of outputs of the spike detection units 421 to 426 and outputs of corresponding ones of the D flip-flops 431 to 436, and output a result of the AND operation to the OR gate 450.

When the result of the AND operation is 1, the OR gate 450 determines detection of a first time when an address output by the counter 460 becomes identical to an address of one of the neurons 411 to 416 generating a spike, and outputs a strobe having a pulse shape.

FIG. 4 illustrates the case in which a 0-th neuron 411, a first neuron 412, a third neuron 414, and a 126-th neuron 415 of the neurons 411 to 416 generate spikes. The OR gate 450 outputs corresponding strobes having a pulse shape in the same order in which the spikes are generated.

Figure 5:
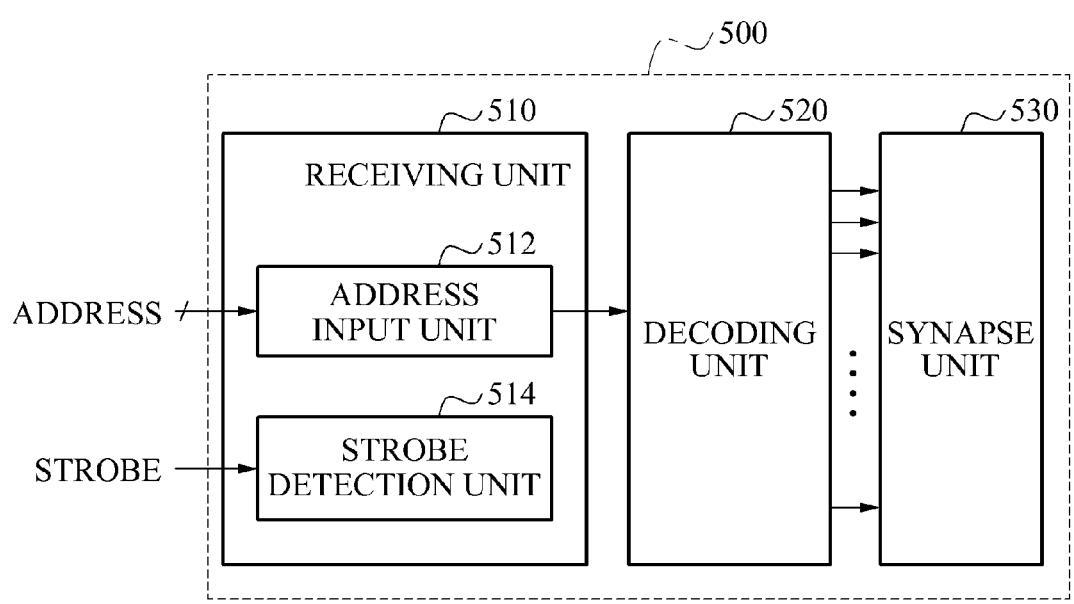
FIG. 5 is a diagram illustrating an example of a partial structure of a neuromorphic chip including a receiving unit that receives a spike event.

FIG. 5 is a diagram illustrating an example of a partial structure of a neuromorphic chip 500 including a receiving unit 510 that receives a spike event, and may be used as the receiving unit 140 in FIG. 1.

Referring to FIG. 5, the neuromorphic chip 500 includes the receiving unit 510, a decoding unit 520, and a synapse unit 530. The decoding unit 520 and the synapse unit 530 may be used as the decoding unit 150 and the synapse unit 160 in FIG. 1.

The receiving unit 510 includes an address input unit 512 and a strobe detection unit 514.

The strobe detection unit 514 receives a strobe that represents time information about a spike occurrence time.

The address input unit 512 receives addresses sequentially and repeatedly through an address bus. When the strobe detection unit 514 detects a strobe, the address input unit 514 inputs an address that was received through the address bus at a strobe detection time to the decoding unit 520.

When the decoding unit 520 receives the input address from the receiving unit 510, the decoding unit 520 generates a pulse having a shape of a spike, and transmits the pulse to a synapse in the synapse unit 530 that is connected to a neuron corresponding to the received input address.

The synapse unit 530 includes synapses. The synapses control a connection strength of the spike transmitted by the decoding unit 520 according to a connection strength control variable generated by a bias generation unit (not shown, but like the bias generation unit 170 in FIG. 1), and then transmit the spike having the controlled connection strength to neurons connected to the synapses (not shown, but like the neurons in the neuron unit 110 in FIG. 1 or the neurons 411 to 416 in FIG. 4).

Figure 6:
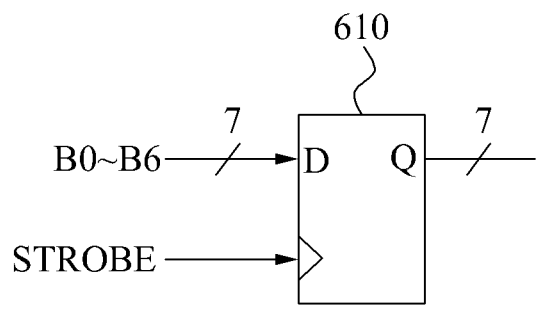
FIG. 6 is a diagram illustrating an example of a receiving unit that receives a spike event in a neuromorphic chip.

FIG. 6 is a diagram illustrating an example of a receiving unit that receives a spike event in a neuromorphic chip, and may be used as the receiving unit 140 in FIG. 1 and the receiving unit 510 in FIG. 5.

Referring to FIG. 6, the neuromorphic chip includes a D flip-flop 610 serving as a receiving unit that receives address information of a neuron in which a spike event occurs.

The D flip-flop 610 receives addresses sequentially and repeatedly as address bits B0 to B6 through an address bus, and detects a strobe that represents time information about a spike occurrence time by a clock. When the D flip-flop 610 detects the strobe, the D flip-flop 610 inputs an address that was received through the address bus at a strobe detection time to a decoding unit (not shown, but like the decoding unit 520 in FIG. 5).

A method of separately synchronizing and transmitting address information of a neuron in which a spike event occurs and time information about a spike event occurrence time will now be described.

Figure 7:
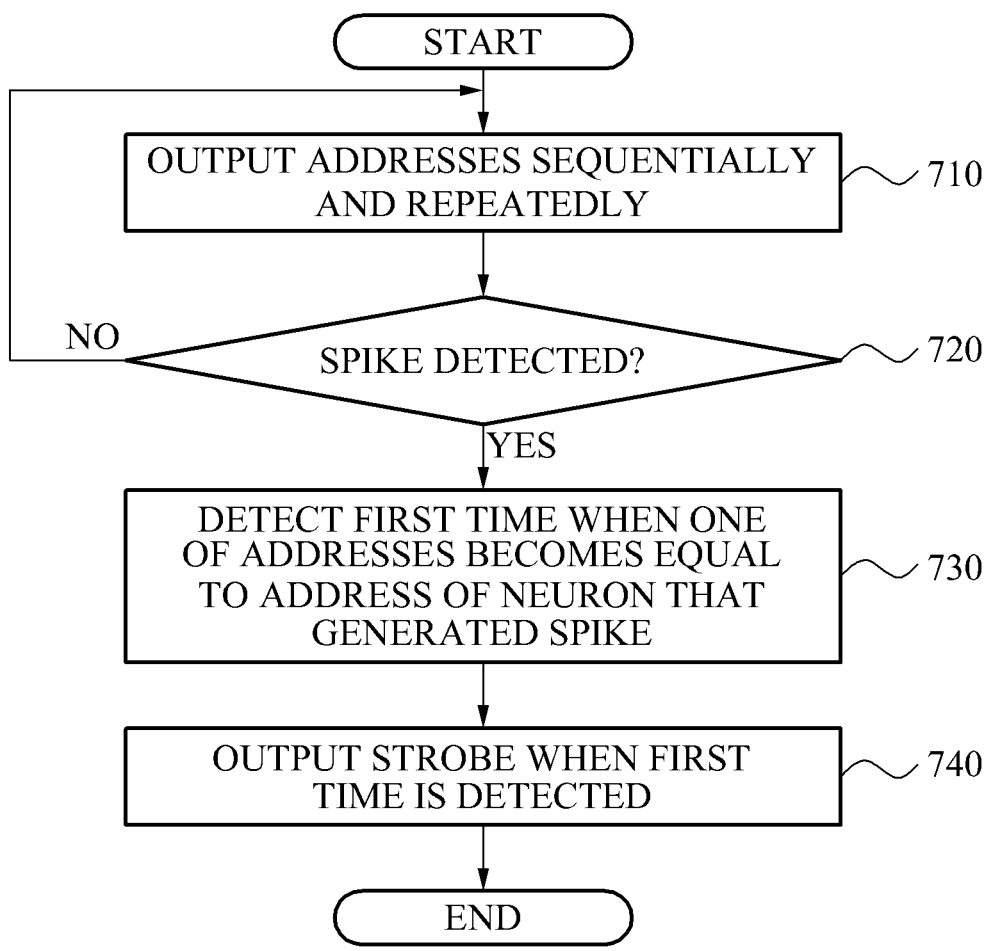
FIG. 7 is a flowchart illustrating an example of a method of transmitting a spike event in a neuromorphic chip.

FIG. 7 is a diagram illustrating an example of a method of transmitting a spike event in a neuromorphic chip.

Referring to FIG. 7, in 710, a transmission apparatus of the neuromorphic chip outputs addresses sequentially and repeatedly to an address bus.

In 720, the transmission apparatus detects whether a spike has been generated by a neuron.

When a spike is not detected in 720, the transmission apparatus returns to 710.

When a spike is detected in 720, in 730, the transmission apparatus detects a first time when the addresses being sequentially and repeatedly output to the address bus become identical to an address of the neuron that generated the spike.

In 740, the transmission apparatus outputs a strobe that represents time information about a strobe occurrence time when the transmission apparatus detects the first time.

Figure 8:
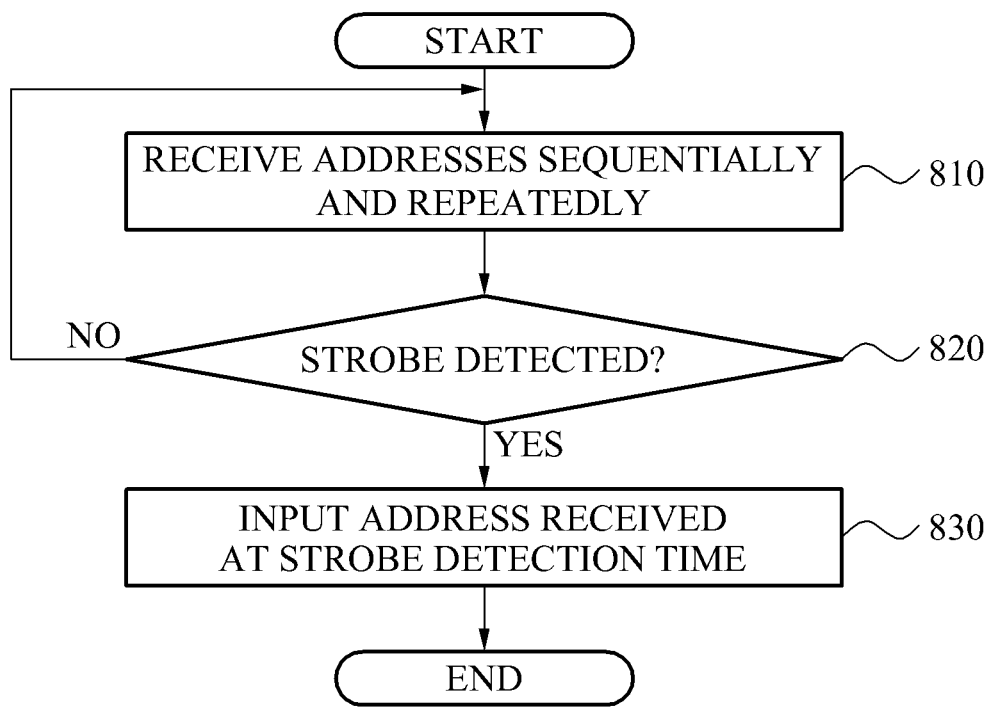
FIG. 8 is a flowchart illustrating an example of a method of receiving a spike event in a neuromorphic chip.

FIG. 8 is a diagram illustrating a method of receiving a spike event in a neuromorphic chip.

Referring to FIG. 8, in 810, a receiving apparatus of the neuromorphic chip receives addresses sequentially and repeatedly through an address bus.

In 820, the receiving apparatus detects whether a strobe that represents time information about a spike occurrence time has been received.

When a strobe is not detected in 820, the transmission apparatus returns to 810.

When a strobe is detected in 820, in 830, the transmission apparatus inputs an address that was received through the address bus at a strobe detection time as an input address.

Several examples have been described above. Nevertheless, it will be understood that various modifications may be made in these embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the claims and their equivalents.

What is claimed is:

1. A transmission apparatus for transmitting a spike event in a neuromorphic chip comprising the transmission apparatus, the transmission apparatus comprising:
    an address output unit configured to output addresses sequentially and repeatedly to an address bus;
    spike detection units configured to detect spikes generated by corresponding neurons;
    output-time detection units corresponding to the spike detection units, the output-time detection units being configured to detect a first time when one of the addresses being output sequentially and repeatedly becomes identical to an address of one of the neurons that has generated a spike after the spike generated by the neuron is detected by a corresponding one of the spike detection units; and a strobe output unit configured to output a strobe that represents time information about a spike occurrence time of the spike generated by the neuron when the corresponding one of the output-time detection units detects the first time.

2. The transmission apparatus of claim 1, wherein the strobe has a pulse shape.

3. The transmission apparatus of claim 1, wherein the neuromorphic chip further comprises the neurons; and the addresses are allocated to the neurons of the neuromorphic chip so that each of the addresses corresponds to a different one of the neurons of the neuromorphic chip.

4. The transmission apparatus of claim 1, wherein the neuromorphic chip further comprises a clock generation unit configured to generate an address generation clock; and the address output unit comprises a counter configured to increase a counter value in response to the address generation clock generated by the clock generation unit, output the counter value to the address bus as an address of one of the neurons, and initialize the counter value every predetermined period.

5. The transmission apparatus of claim 4, wherein the clock generation unit is further configured to generate a neuron detection clock that operates the spike detection units; and the spike detection units are further configured to detect the spikes generated by the corresponding neurons in response to the neuron detection clock.

6. The transmission apparatus of claim 5, wherein the clock generation unit is further configured to generate the address generation clock so that the address generation clock has at least as many clock periods as there are neurons during one clock period of the neuron detection clock.

7. The transmission apparatus of claim 1, wherein each of the output-time detection units comprises:

a D flip-flop configured to receive an input pulse, delay the received input pulse by one clock period, and output the delayed input pulse using a same clock as the address output unit; and an AND gate configured to perform an AND operation of an output of a corresponding one of the spike detection units and the delayed input pulse output by the D flip-flop, and output a result of the AND operation to the strobe output unit.

8. The transmission apparatus of claim 7, wherein the D flip-flop is further configured to output the delayed input pulse to an input of the D flip-flop of a next one of the output-time detection units corresponding to a next one of the addresses output by the address output unit.

9. The transmission apparatus of claim 1, wherein the strobe output unit comprises an OR gate configured to perform an OR operation on outputs of the output-time detection units, and output a result of the OR operation as the strobe.

10. The transmission apparatus of claim 1, wherein the address bus comprises a number of address lines greater than or equal to $\log_2 M$, wherein M is a total number of the neurons.

11. A receiving apparatus for receiving a spike event in a neuromorphic chip comprising the receiving apparatus, the receiving apparatus comprising:

a strobe detection unit configured to detect a strobe that represents time information about a spike occurrence time of a spike generated by a neuron; and an address input unit configured to receive addresses sequentially and repeatedly through an address bus, and input an address received by the address input unit through the address bus at a strobe detection time when the strobe detection unit detects the strobe.

12. The receiving apparatus of claim 11, wherein the strobe has a pulse shape.

13. The receiving apparatus of claim 11, wherein the neuromorphic chip further comprises a plurality of neurons; and the addresses are allocated to the neurons of the neuromorphic chip so that each of the addresses corresponds to a different one of the neurons of the neuromorphic chip.

14. The receiving apparatus of claim 11, wherein the neuromorphic chip further comprises a plurality of neurons; and the address bus comprises a number of address lines greater than or equal to $\log_2 M$, wherein M is a total number of the neurons of the neuromorphic chip.

15. A receiving apparatus for receiving a spike event in a neuromorphic chip comprising the receiving apparatus, the receiving apparatus comprising:

a D flip-flop configured to receive addresses sequentially and repeatedly through an address bus, detect a strobe that represents time information about a spike occurrence time of a spike generated by a neuron, and input an address received by the D flip-flop through the address bus at a strobe detection time when the D flip-flop detects the strobe.

16. A method of transmitting a spike event in a neuromorphic chip, the method comprising:

outputting addresses sequentially and repeatedly to an address bus;

detecting a spike generated by a neuron; and outputting, when the spike is detected, a strobe that represents time information about a spike occurrence time of the spike generated by the neuron at a first time when one of the addresses being sequentially and repeatedly output becomes identical to an address of the neuron that generated the spike.

17. The method of claim 16, wherein the strobe has a pulse shape.

18. The method of claim 16, wherein the neuromorphic chip comprises a plurality of neurons;

the neuron that generated the spike is one of the neurons; and the addresses are allocated to the neurons of the neuromorphic chip so that each of the addresses corresponds to a different one of the neurons of the neuromorphic chip.

19. The method of claim 16, wherein the neuromorphic chip comprises a plurality of neurons;

the neuron that generated the spike is one of the neurons; and the address bus comprises a number of address lines greater than or equal to $\log_2 M$, wherein M is a total number of the neurons of the neuromorphic chip.

20. A method of receiving a spike event in a neuromorphic chip, the method comprising:

receiving addresses sequentially and repeatedly through an address bus;

detecting a strobe that represents time information about a spike occurrence time of a spike generated by a neuron; and inputting an address received through the address bus at a strobe detection time when the strobe is detected.

21. The method of claim 20, wherein the strobe has a pulse shape.

22. The method of claim 20, wherein the neuromorphic chip comprises a plurality of neurons; and the addresses are allocated to the neurons of the neuromorphic chip so that each of the addresses corresponds to a different one of the neurons of the neuromorphic chip.

23. The method of claim 20, wherein the neuromorphic chip comprises a plurality of neurons; and
the address bus comprises a number of address lines greater than or equal to $\log_2 M$, wherein M is a total number of the neurons of the neuromorphic chip.

* * * * *